United States Patent [19]
Flegeo

[11] Patent Number: 6,107,971
[45] Date of Patent: Aug. 22, 2000

[54] PORTABLE ELECTRONIC DEVICE WITH AN ANTENNA

[75] Inventor: Arnaud Flegeo, Challes, France

[73] Assignee: U.S. Philips Corporation, New York, N.Y.

[21] Appl. No.: 09/280,168

[22] Filed: Mar. 29, 1999

[30] Foreign Application Priority Data

Mar. 31, 1998 [FR] France .................................. 98 03984

[51] Int. Cl.⁷ .................................................. H01Q 1/24
[52] U.S. Cl. ............................ 343/702; 343/906; 455/90
[58] Field of Search .................................. 343/702, 906, 343/900, 901; 455/90; H01Q 1/24

[56] References Cited

U.S. PATENT DOCUMENTS

| | | | |
|---|---|---|---|
| 5,754,141 | 5/1998 | Thompson et al. | 343/702 |
| 5,969,682 | 10/1999 | Ito et al. | 343/702 |
| 5,973,646 | 10/1999 | Engblom | 343/702 |

FOREIGN PATENT DOCUMENTS

| | | | |
|---|---|---|---|
| 0773632A1 | 5/1997 | European Pat. Off. | H04B 1/38 |
| 0773633A2 | 5/1997 | European Pat. Off. | H04B 1/38 |
| 09214225 | 1/1996 | Japan | H01Q 1/24 |
| 10173420 | 12/1996 | Japan | H01Q 1/24 |

*Primary Examiner*—Hoanganh Le

[57] ABSTRACT

A portable electronic device has a housing, a printed circuit board within the housing, and an antenna. The printed circuit board has two parts, a first part to be electrically coupled to the antenna, and a second part with electronic circuitry that, before assembly of the portable electronic device, is mechanically coupled to the first part via a weak spot. The first and second parts are electrically connected to each other. Upon assembly of the portable electronic device, the first and second parts are mechanically separated from each other while still being electrically connected to each other. The first part is then fastened to a housing part of the portable electronic device, and the antenna is electrically connected to the fastened first part.

11 Claims, 2 Drawing Sheets

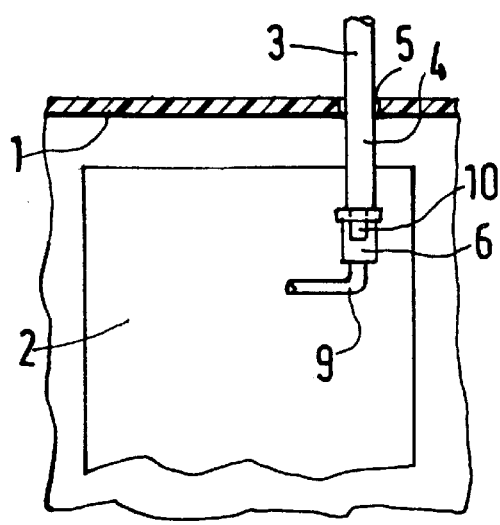
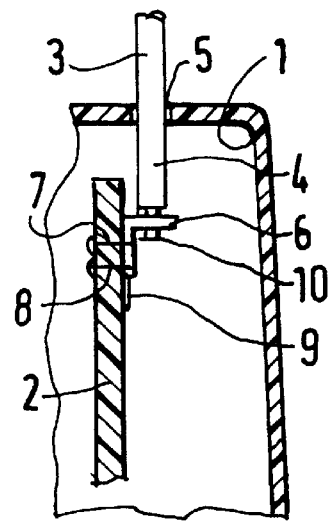
FIG.1A PRIOR ART  FIG.1B PRIOR ART
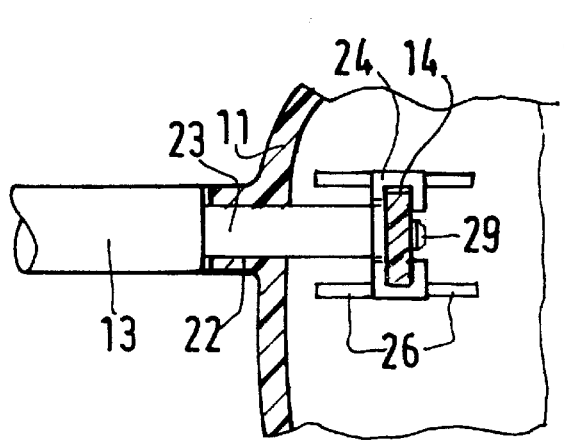
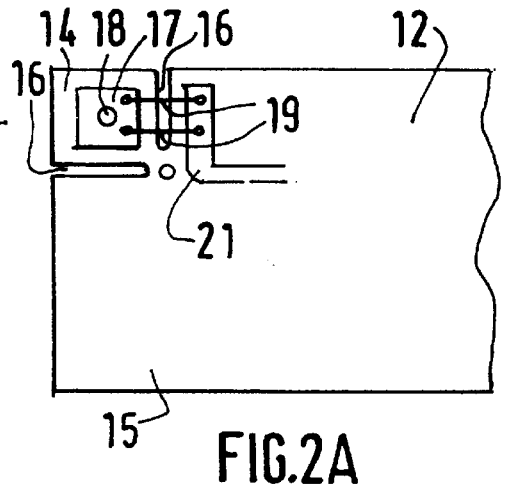
FIG.2C  FIG.2A
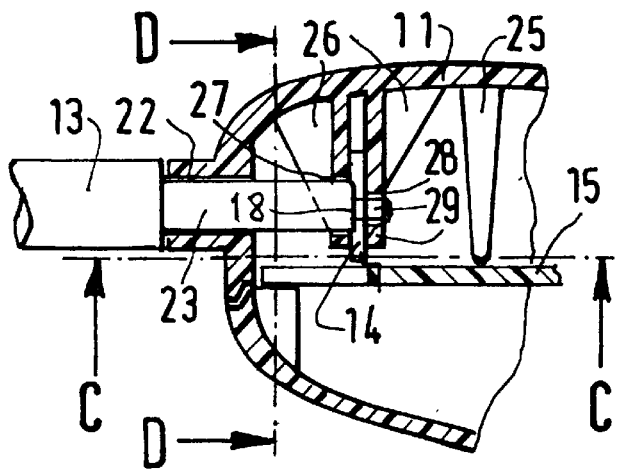
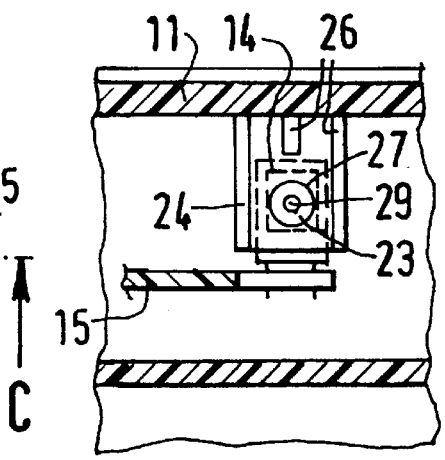
FIG.2B  FIG.2D

PORTABLE ELECTRONIC DEVICE WITH AN ANTENNA

FIELD OF THE INVENTION

The present invention relates to a portable electronic device that includes a housing formed by several joining parts and an antenna for at least the reception of radio-frequency waves, which device includes internal fastening means for the antenna and at least a printed circuit board for the support and connection of components and/or accessories in said housing.

The invention is particularly intended for small devices such as small radio sets or for wireless telephone handsets; these two products generally having an antenna called whip antenna or telescopic antenna. The invention may also be applied to a mobile telephone handset, notably in the technology in which the antenna comprises only a single wire, being movable between a rest position, in which the antenna is nearly entirely pushed into the housing, and a transceiver operating position, in which it is nearly entirely drawn out of the housing.

BACKGROUND OF THE INVENTION

Devices such as portable radios or wireless telephones utilize a rather simple technology; but they must be able to resist shocks, notably shocks on the antenna which may be violently transferred to the inside of the housing by the hidden end of the antenna on its support, there being understood that the antenna is not mounted loosely inside the housing, but that it is fixed sufficiently rigidly to form one whole with the latter, even when it is extracted.

In known manner, the antenna may be supported by a printed circuit board which is itself attached to or accommodated in the housing so that there is maximum reduction of the play between this board and the housing. Therefore, a metallic part in the form of an angle cleat is fixed to the printed circuit by one of its branches, in the same way as a component, by pins firmly attached to the angle cleat, which go across the printed circuit and are soldered loosely to a conducting area to ensure the necessary electric continuity between the antenna and the input stage or input/output stage of the device. The second branch of the angle cleat, in a direction substantially perpendicular to the printed circuit board, is pierced by a tapped hole. The antenna is mounted by screwing it with its tapering threaded lower end into said tapped hole. Besides, the antenna is kept attached in lateral direction relative to the body of the device at the spot where it passes through the housing. In case the antenna receives a shock, notably after a fall, this shock is transferred to the metallic part in the form of an angle cleat used as a base which is very rigid, and from there to the printed circuit itself, which may cause its failure, even its breakage after several drops and may render the device unusable. Besides the technical problem linked with the drop, there is also the problem of having to supply an additional part, that is to say, the metallic angle cleat that necessitates a particular shaping and delicate handling which one should like to avoid during mounting. It will be noted that for diminishing the first technical problem, which consists of transferring a shock on the antenna to the printed circuit inside the device, a solution would consist of making the supporting part less rigid by replacing the angle cleat by an elastic metallic strip. But this measure would be at the cost of an aggravation of the second problem indicated above, because it would complicate the additional supporting part and its mounting.

SUMMARY OF THE INVENTION

According to the invention, the prior-art drawbacks are diminished thanks to the fact that the electronic device defined in the first paragraph is characterized in that said fastening means of said antenna include a separate part of said printed circuit and are firmly attached to the inside part of a joining part that forms a part of said housing which is passed through freely at least by the lower part of the antenna.

Thus, the pursued objects are achieved: the anchoring of the base of the antenna has been moved from the printed circuit to the housing of the device and, before mounting, the additional support element is eliminated, because it is replaced by a separate part of the printed circuit which is in fact a part with an indented and divisible edge of this printed circuit.

An advantageous embodiment of the invention for a whip antenna intended for a radio set or a wireless telephone is characterized in that said printed circuit comprises a small separate part, mechanically separated by folding away its main remaining part, but electrically connected to said main part by at least one conductor, said fastening means of the antenna being formed by a support belonging to the inside of said joining part, by said separate part confined to said support and by the lower end of the antenna which has a fastening element.

It will be noted that the electric continuity between the antenna and the electronic input/output circuits of the device is always to be ensured. With this object, a preferred variant of the embodiment indicated in the preceding paragraph is characterized in that said separate part of the printed circuit includes a metallized area linked to said conductor, a bore that runs into said metallized part, which is located between two holes in said support and which is passed through by the threaded lower end of the antenna forming said fastening element, so that a shoulder of the lower end of the antenna is in close contact with said metallized portion of said separate part.

In the latter version of the device, the antenna is not firmly attached to its plastic support which belongs to the inside wall of a half of the housing, but it is only retained with little play, which is sufficient for its use.

A portable transmitting communication device, also called mobile telephone, is generally the fruit of technology that is slightly different from that of wireless telephones. It notably comprises an antenna with a single wire protected by a coating of plastic material, which freely runs through an electrically conducting antenna support, which support is fastened to a joining part of the housing at the location where this joining part has a reinforced feedthrough.

A preferred embodiment of a mobile telephone according to the invention is characterized in that said printed circuit includes a small separate part, mechanically disconnected by folding it away from its remaining main part, but electrically connected to said main part by at least one conductor, said fastening means of the antenna being formed by said separate part of the printed circuit and by said antenna support.

A preferred variant of the mobile telephone according to the invention is characterized in that said separate part of the printed circuit has a metallized hole, electrically connected to a metallized area itself connected to said conductor and in that said antenna support is fastened to said joining part by pinching the latter at the location of said feedthrough, between an outside shoulder of said antenna support and said separate part on the inside, by tight-screwing in the metallized hole of the latter with self-tapping, the lower end of said antenna support being threaded for this purpose.

The technology of mobile telephones utilizes printed circuits with metallized holes, which enables a simple embodiment of the invention while ensuring an excellent electrical contact between a conducting track of the main part of the printed circuit and the antenna support.

BRIEF DESCRIPTION OF THE DRAWINGS

These and other aspects of the invention are apparent from and will be elucidated, by way of non-limitative example, with reference to the embodiments described hereinafter.

In the drawings:

FIGS. 1A and 1B represent in a cross-sectional and partial view a prior-art wireless telephone: in A in front view and in B seen from the left, FIGS. 2A–2D represent in A partially a first printed circuit for implementing the invention and in a cross-sectional partial view a wireless telephone according to the invention: in B in front view and in C seen from below along line C—C of FIG. 2B and in D seen from the left along the section D—D of FIG. 2B, FIGS. 3A–3C represent in A a partial view of a second printed circuit for implementing the invention and in a cross-sectional view a mobile telephone: in B in front view and in C seen from the right along section C—C of FIG. 3B.

In the various Figures, like references represent like elements with like functions.

DESCRIPTION OF PREFERRED EMBODIMENTS

Figure 3C:
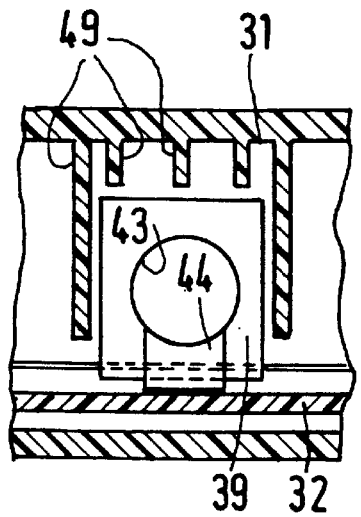

In FIG. 1 is diagrammatically represented a prior-art wireless telephone; it could also be a small wireless radio set. The housing of the device is represented by a joining part 1 in which is fixed by any known means (not shown) a printed circuit board 2. The board may be locked, for example, by screwing it against one of the joining parts or also by simply locking it by means of ribs provided for this purpose, which lock the board when the joining parts are put in place when the device is mounted. To ensure the operation of the device, a whip antenna 3 is provided. This telescopic antenna is extracted to a position called outward position for using the device, and pushed back when the device is in a state of rest. In the two positions, the antenna is to form one whole with the device. This means that the first segment (4), which is the thickest and which is only visible in FIG. 1, retains a fixed position, fixed relative to the device. For this purpose, the segment 4 of the antenna is positioned at two fixed points of the sub-assembly formed by the combined elements 1 and 2 of the device, that is, an element fixed to the printed circuit and a feedthrough hole of the joining part referenced 5. The fastening element in question is a metallic part in the form of an angle cleat 6. One branch of the angle cleat is pressed against this printed circuit to which it is fastened by means of two pins 7, 8 which are firmly attached thereto, which pass through the printed circuit board and are wave soldered on the opposite side, in the same way as other electronic components which are not represented. The angle cleat 6 is in electrical contact with a metallic track 9 itself connected (in a manner not shown) to the input radio circuit or input/output radio circuit of the device. The end part 10 of the segment 4 is tapering and threaded, thanks to which the antenna 3 is screwed into a tapped hole of the branch of the angle cleat, which is perpendicular to the printed circuit. In this manner a good fastening of the antenna to the device is obtained and a good electrical connection of the antenna to the input circuit (or output circuit). However, a shock of the antenna 3 is directly transferred to the printed circuit 2, which may damage the latter. Furthermore, for fastening the antenna 3, the special part 6 must be fastened to the printed circuit 2.

FIG. 2 represents a small radio set or a wireless telephone according to the invention, in which the part 6 is retracted and the antenna 13, which is a whip antenna, is not fastened to the printed circuit, but to a part inside a joining part 11. The printed circuit 12 of FIG. 2A comprises, in one corner, a removable part 14 that has a substantially square shape and is nearly entirely separated from the remaining main part 15 by two slots 16 which form a precut. The part 14 comprises a metallized area 17 with a bore 18. Two conductors 19 connect the metallized area 17 to a metallized area 21 of the main part 15, which is in its turn connected to the input (output) stage (not shown) of the device. The embodiment of the elements 16 to 19 and 21 is effected in well conventional technology, well known for printed circuits. Before the printed circuit board 12 is installed in the device, the parts 14 and 15 are folded away by twisting while care is taken not to break the conductors 19. These conductors are made of, for example, phosphorous bronze in order to be able to withstand considerable deformations.

When reference is made to FIG. 2C, it may be noted that the joining part 11 possesses in known manner a reinforced feedthrough 22 which freely allows the lower, preferably tapering, part 23 of the antenna 13 to pass through. On the other hand, the joining part 11 comprises on the inside a bulge 24 intended to be used as a support for the antenna 13. In fact, the support 24 and the separate part 14 of the printed circuit co-operate to form fastening means for the antenna 13. Preferably, the support 24 is realized by injection-molding plastic material at the same time as joining part 11; this support is hollow in order to accommodate the separate part 14 of the printed circuit while the main part 15 is kept in place by ribs such as 25 of FIG. 2B in the joining part. It will be noted that the support 24 also has ribs such as 26 (visible in the FIGS. 2B, 2C and 2D) which are reinforcement ribs intended to receive the vertical forces exerted by the antenna. The support 24 also has two holes 27 and 28 situated opposite each other and at the level of which is the bore 18 of the separate part 14. At its tapering lower end 23, the antenna 13 comprises a stop 29 which is even thinner, threaded, and forms a fastening element.

After printed circuits 14 and 15 have been put in place in the joining part, the fastening of the antenna 13 is simple: it is sufficient to put its tapering part 23 through the orifice 22 where it is guided until the threaded slightly chamfered end 29 ends up against the edges of the bore 18 after having freely passed through the hole 27. The antenna is then screwed into the tapped hole until the shoulder between the end parts 23 and 29 comes into contact with the metallized area 17. A good electrical and mechanical link of the antenna 13 is obtained in this manner and the shocks on the antenna are transferred to the joining part 11 and not to the main part 15 of the printed circuit.

Figure 3B:
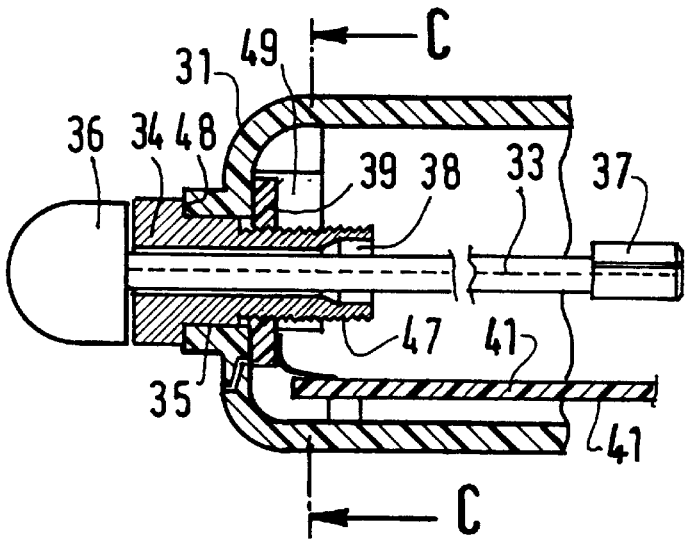
Figure 3A:
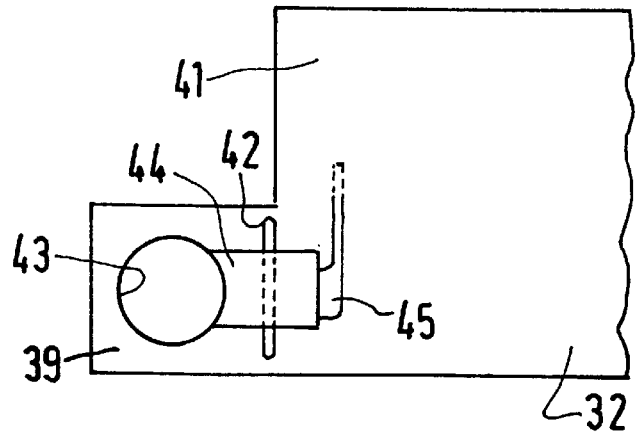

The FIGS. 3B and 3C represent a portable telephone handset, also called mobile, according to the invention, and FIG. 3A represents a particular printed circuit board intended therefor. In the prior art, the technology used for realizing the antenna is different from that used for a wireless telephone. It is no longer a whip antenna, but an antenna with a single wire 33 which runs freely through a metallic antenna support 34. Habitually, the antenna support is screwed into a reinforced feedthrough opening 35 in the joining part 31, preferably into another threaded metallic piece (not shown) itself inserted into the reinforced feedthrough 35. The antenna proper is kept locked, running in the support 34 by a wide insulating outside end 36 and a wide metallic inside end 37 which is in electrical contact with the antenna wire 33. When the antenna is extracted for being operational, the end 37 enters into contact with friction in a housing 38 situated below the support 34 in order to realize both a mechanical blocking and an electrical connection. In the prior art, the electrical connection between the support 34 and a conducting track of the printed circuit 32 is ensured by an additional metallic part on the printed circuit board, which metallic part is placed such that it comes into elastic contact with the support 34 when the device is being mounted. The antenna of FIG. 3 differs from the prior-art antenna in the way that the support 34 is, on the one hand, attached to the joining part 31 at the location of the feedthrough 35 and, on the other hand, electrically connected to a conducting track of the printed circuit 32. This printed circuit 32 represented in FIG. 3A is similar to the circuit 12 of FIG. 2A. It comprises at one end a bulge 39, which may be separated by folding it away from a main part 41. To facilitate the folding, a slot is made in the form of a buttonhole 42 that nearly completely separates the parts 39 and 41. The printed circuit used is of the type FR4 or CEM3 that use metallized holes. One of these metallized holes 43 is made in the part 39 that may be separated and a conducting metal sheet 44, for example, of pre-tinned copper is connected by one end to the metallization layer of the hole 43 and by its other end to a conducting track 45 of the part 41, similar to the track 21 of FIG. 2A.

The antenna support 34 differs from that of the prior art described above in that its threaded end 47 freely runs through the feedthrough opening 35 (FIG. 3B), until a shoulder 48 stops against the outside edge of the feedthrough opening 35. To ensure a sturdy fastening of the support 34 to the joining part 31, the support is screwed into the metallized opening 43 of the part 39 of the printed circuit, previously folded away from the part 41 during the mounting of the device. To avoid the separate part 39 rotating while being screwed down, positioning and hold-down ribs 49 are provided in FIG. 3C (where the antenna is not represented). The separate part 39 thus plays the role of a tightening nut for the support 34 which is similar to a bolt, these two elements forming the fastening means of the antenna. In this manner an excellent fastening of the antenna to the joining part 31 is thus combined at little cost, combined with a good continuity of the electrical contact between the wire 33 of the antenna and the track 45 of the printed circuit, via the elements 37, 34, 43 and 44.

It will be noted that, for the two embodiments of the invention of FIGS. 2 and 3 described above, the separate part and the main part of the printed circuit board, after folding and mounting, end in substantially perpendicular planes.

As regards the embodiment of FIG. 2, a variant (not shown) comprises the use of a printed circuit in which metallized holes may be provided. If the hole 18 is metallized (FIG. 2A), the support 24 may be realized in a simplified manner because it comprises only a single partitioning wall with a hole that is freely passed through by the threaded end 29 of the antenna. After screwing this threaded end into the separate part 14 of the printed circuit, said partitioning wall is found back pinched between the part 14 that serves as a nut and a shoulder of the end 23 of the antenna that serves as a bolt.

What is claimed is:

1. A portable electronic device comprising:
   a housing;
   an antenna;
   internal fastening means for fastening the antenna to the housing; and
   a printed circuit board, the internal fastening means comprising a first part of the printed circuit board, and an internal part of the housing, whereby the first part is mechanically connected to a second part of the printed circuit board before assembly of the portable electronic device, and the first part is separated from the second part after the assembly, and the first and second parts are electrically connected to each other via a conductor, before and after said assembly.

2. A portable electronic device as claimed in claim 1, wherein the first part comprises a metallized area having a bore, the metallized area being electrically connected to the conductor, and wherein the internal part is a hollow support with holes in-line with the bore, the hollow support accommodating the first part, a lower end of the antenna being threaded and passing through the holes and the bore, such that a shoulder of the lower end of the antenna is in close contact with the metallized area, the threaded lower end being part of the internal fastening means.

3. A portable electronic device as claimed in claim 1, wherein the conductor is a metal sheet.

4. A portable electronic device as claimed in claim 1, wherein the first and second parts stretch out in substantially perpendicular planes.

5. A portable electronic device comprising:
   a housing;
   an antenna partly mounted outside said housing;
   a printed circuit board within said housing, said printed circuit board comprising a first circuit board part at least provided with circuitry, and a second circuit board part for electrically coupling said circuitry to said antenna,
   said first and second circuit board parts being mechanically connected to each other via a weak material spot in printed circuit board substrate material before mounting of said printed circuit board in said portable electronic device, and said first and second circuit board parts being separated from each other after mounting of said printed circuit board in said portable electronic device, whereby said separation of said first and second circuit board parts is caused by bending said second circuit board part when mounting said printed circuit board in said housing, and
   said first and second circuit board parts comprising at least one deformable conductor for electrically coupling said circuitry to said antenna, said deformable conductor deforming but not breaking off when said second circuit board part is bent during said mounting;
   said housing comprising a first housing part through which said antenna extends, and a second housing part inside said housing, said second housing part receiving said second circuit board part when mounting said printed circuit board in said electronic device, and said second housing part and said second circuit board part forming antenna fastening means for electrically and mechanically fastening said antenna within said housing.

6. A portable electronic device as claimed in claim 5, wherein said second circuit board part is bent over substantially ninety degrees when mounting said printed circuit board in said portable electronic device.

7. A portable electronic device comprising:
   a housing;
   an antenna a having a wire;

an electrically conducting antenna support that is fastened to the housing at a location of a reinforced feedthrough of the housing, the wire freely running through the electrically conducting antenna support; and a printed circuit board comprising a first part and a second part, whereby the first part is mechanically connected to the second part before assembly of the portable electronic device, and the first part is separated from the second part after the assembly, and the first and second parts are electrically connected to each other via a conductor, before and after said assembly, the electrically conducting antenna support and the first part fastening the antenna.

8. A portable electronic device as claimed in claim 7, wherein a lower end of the electrically conducting antenna support is threaded, and the first part of the printed circuit board has a metallized area and a metallized feedthrough hole that is electrically connected to the metallized area, the metallized area being electrically connected to the conductor, and the electrically conducting antenna support being fastened to the housing by pinching the electrically conducting antenna support, at the location of the reinforced feedthrough of the housing, between an outside shoulder of the electrically conducting antenna support and the first part, and by tight-screwing the pinched electrically conducting antenna support in the metallized feedthrough hole in a self-tapping way.

9. A portable electronic device as claimed in claim 7, wherein the conductor is a metal sheet.

10. A portable electronic device as claimed in claim 7, wherein the first and second parts stretch out in substantially perpendicular planes.

11. A portable electronic device comprising:

a housing;

an antenna;

a printed circuit board comprising a first part and a second part, before assembly of the portable electronic device the first part being mechanically attached to the second part and being electrically connected to the second part via a conductor, and, after the assembly the first part being mechanically separated from the second part, the first part, in conjunction with a housing part, fastening the antenna.

* * * * *